US011031044B1

(12) United States Patent
Lee et al.

(10) Patent No.: US 11,031,044 B1
(45) Date of Patent: Jun. 8, 2021

(54) METHOD, SYSTEM AND COMPUTER PROGRAM PRODUCT FOR SELF-LEARNED AND PROBABILISTIC-BASED PREDICTION OF INTER-CAMERA OBJECT MOVEMENT

(71) Applicant: MOTOROLA SOLUTIONS, INC., Chicago, IL (US)

(72) Inventors: Chia Ying Lee, Medford, MA (US); Aleksey Lipchin, Newton, MA (US); Ying Wang, Woburn, MA (US); Kangyan Liu, Revere, MA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/819,967

(22) Filed: Mar. 16, 2020

(51) Int. Cl.
| | |
|---|---|
| *G11B 17/10* | (2006.01) |
| *H04N 7/18* | (2006.01) |
| *G06F 16/735* | (2019.01) |
| *G11B 27/10* | (2006.01) |
| *G06N 3/08* | (2006.01) |
| *G06F 16/783* | (2019.01) |
| *H04N 5/77* | (2006.01) |

(52) U.S. Cl.
CPC ............ *G11B 27/10* (2013.01); *G06F 16/735* (2019.01); *G06F 16/784* (2019.01); *G06N 3/08* (2013.01); *G06T 2207/30196* (2013.01); *H04N 7/181* (2013.01)

(58) Field of Classification Search
USPC ............... 386/226, 228, 230, 239, 248, 278; 348/169
See application file for complete search history.

(56) References Cited

U.S. PATENT DOCUMENTS

| | | | |
|---|---|---|---|
| 9,633,253 B2 * | 4/2017 | Miyano | G06K 9/00342 |
| 10,121,515 B2 | 11/2018 | Doumbouya et al. | |
| 2014/0219504 A1 * | 8/2014 | Haraguchi | G06K 9/00369 |
| | | | 382/103 |
| 2019/0258852 A1 * | 8/2019 | Shimauchi | G06T 7/20 |

FOREIGN PATENT DOCUMENTS

| | | |
|---|---|---|
| CN | 102436662 B | 5/2012 |
| KR | 20090021613 A | 6/2009 |

OTHER PUBLICATIONS

Thelandersson, Anton and Oskarsson, Olafur Mar: "Topology Inference for Non-Overlapping Camera Networks", (2019) In LU-CS-EX Dec. 2019 EDAM05 20191, Department of Computer Science, Sep. 16, 2019, all pages.

(Continued)

*Primary Examiner* — Daquan Zhao (57) ABSTRACT

A method, system and computer program product for self-learned and probabilistic-based prediction of inter-camera object movement is disclosed. The method includes building and storing a transition model defined by transition probability and transition time distribution data generated during operation of a first video camera and one or more other video cameras over time. The method also includes employing at least one balance flow algorithm on the transition probability and transition time distribution data to determine a subset of the video cameras to initiate a search for an object based on a query. The method also includes running the search for the object over the subset of the video cameras.

20 Claims, 5 Drawing Sheets

(56) References Cited

OTHER PUBLICATIONS

Cho, Y., & Yoon, K. (2017). Distance-based Camera Network Topology Inference for Person Re-identification. Pattern Recognition Letters, 125, 220-227.

Lv, Jianming & Chen, Weihang & Li, Qing & Yang, Can. (2018). Unsupervised Cross-dataset Person Re-identification by Transfer Learning of Spatial-Temporal Patterns, all pages.

* cited by examiner

METHOD, SYSTEM AND COMPUTER PROGRAM PRODUCT FOR SELF-LEARNED AND PROBABILISTIC-BASED PREDICTION OF INTER-CAMERA OBJECT MOVEMENT

BACKGROUND

In certain contexts, intelligent processing and playback of recorded video is an important function to have in a security system. For example, a security system may include many cameras, each of which records video. The total amount of video recorded by those cameras, much of which is typically recorded concurrently, makes relying upon manual location and tracking of an object-of-interest who appears in the recorded video inefficient. Intelligent processing and playback of video, and in particular automated search functionality, may accordingly be used to increase the efficiency with which an object-of-interest can be identified using a security system.

Avigilon Corporation's U.S. Pat. No. 10,121,515 discloses a method, system and computer program product for interactively identifying same individuals or objects present in video recordings. The system disclosed in this patent identifies a query person across multiple cameras connected to a server. A ranked list of matches is generated based on appearance search similarity.

Some presently existing appearance search systems carry out exhaustive searching through the videos recorded for all cameras within a predefined time interval. In such a case the system may be unaware if a match is physically impossible for the given query due to distance between the match and query cameras, limited walking speeds, or other reasons. Furthermore, searching exhaustively in such systems may have negative impacts including, for example, slow searching (due to time spent on searching over impossible cameras and time intervals, an issue that becomes particularly pronounced in large systems), false positive matches (due to inclusion of mis-matches from impossible cameras and time intervals), and sub-optimal ranking (due to not accounting for spatio-temporal relationships between match and query cameras, which may exist even when state-of-the-art appearance signature modeling is used).

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

According to one example embodiment, there is provided a system that includes a plurality of video cameras each having a respective field of view. The video cameras including a first video camera being configured to capture first video and generate metadata for the first video. The metadata includes first and second time and location pairs forming part of a first tracklet and corresponding to a first time period within which an object moves through the field of view of the first video camera. At least one server is coupled to the video cameras, and the server is configured to receive a query specifying a time period, different than the first time period, within which one or more tracklets, different than the first tracklet, exist in relation to the object being detected by one or more of the video cameras other than the first video camera. The server is configured to build and store a transition model defined by transition probability and transition time distribution data generated over time. The server is also configured to employ at least one balance flow algorithm on the transition probability and transition time distribution data to determine a subset of the video cameras to initiate a search for the object based on the query. The server is also configured to run the search for the object over the subset of the video cameras.

According to another example embodiment, there is provided a method that includes capturing first video using a first video camera, and generating metadata for the first video. The metadata includes first and second time and location pairs forming part of a first tracklet and corresponding to a first time period within which an object moves through a field of view of the first video camera. The method also includes receiving a query specifying a time period, different than the first time period, within which one or more tracklets, different than the first tracklet, exist in relation to the object being detected by one or more video cameras other than the first video camera. The method also includes building and storing a transition model defined by transition probability and transition time distribution data generated during operation of the first video camera and the one or more video cameras over time. The method also includes employing at least one balance flow algorithm on the transition probability and transition time distribution data to determine a subset of the video cameras to initiate a search for the object based on the query. The method also includes running the search for the object over the subset of the video cameras.

According to another example embodiment, there is provided a system that includes a plurality of video cameras each having a respective field of view. The video cameras include a first video camera being configured to capture first video and generate metadata for the first video. The metadata includes first and second time and location pairs forming part of a first tracklet and corresponding to a first time period within which an object moves through the field of view of the first video camera. At least one computing machine is coupled to the video cameras. The computing machine is configured to receive a query specifying a time period, different than the first time period, within which one or more tracklets, different than the first tracklet, exist in relation to the object being detected by one or more of the video cameras other than the first video camera. The system also includes at least one processor and at least one tangible, computer-readable storage medium having instructions encoded therein. The instructions, when executed by the at least one processor, cause a carrying out of a method including: building and storing a transition model defined by transition probability and transition time distribution data generated over time; employing at least one balance flow algorithm on the transition probability and transition time distribution data to determine a subset of the video cameras to initiate a search for the object based on the query; and running the search for the object over the subset of the video cameras.

Some example embodiments provide for appearance searching that may be more accurate and fast by limiting searching to only those cameras and time intervals where match likelihood is sufficiently high (for example, above some threshold).

Some example embodiments provide for re-ranking of an appearance search ranking that was carried out spatio-temporally agnostically, by boosting potential matches that are spatio-temporally more likely and lowering potential matches that are spatio-temporally unlikely.

Real-time cross-camera tracking may, in accordance with some example embodiments, be carried out in a less processor resource-intensive manner by leveraging high-probability transition identification to facilitate automated monitoring of only more crucial cameras.

In accordance with some example embodiments, spatio-temporal topology is captured using a transition model, which may be a mathematical model of movement between cameras, defined by the transition probabilities and transition time distributions, based on a Markov chain approach.

Also in accordance with some example embodiments, indirect transitions may be automatically calculated from direct transitions and within-camera dwell times such as, for instance, by calculating all possible paths between two cameras.

Each of the above-mentioned embodiments will be discussed in more detail below, starting with example system and device architectures of the system in which the embodiments may be practiced, followed by an illustration of processing blocks for achieving an improved technical method, system and computer program product for self-learned and probabilistic-based prediction of inter-camera object movement. Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

The term "object" as used herein is understood to have the same meaning as would normally be given by one skilled in the art of video analytics, and examples of objects may include humans, vehicles, animals, etc.

Further advantages and features consistent with this disclosure will be set forth in the following detailed description, with reference to the figures.

Figure 1:
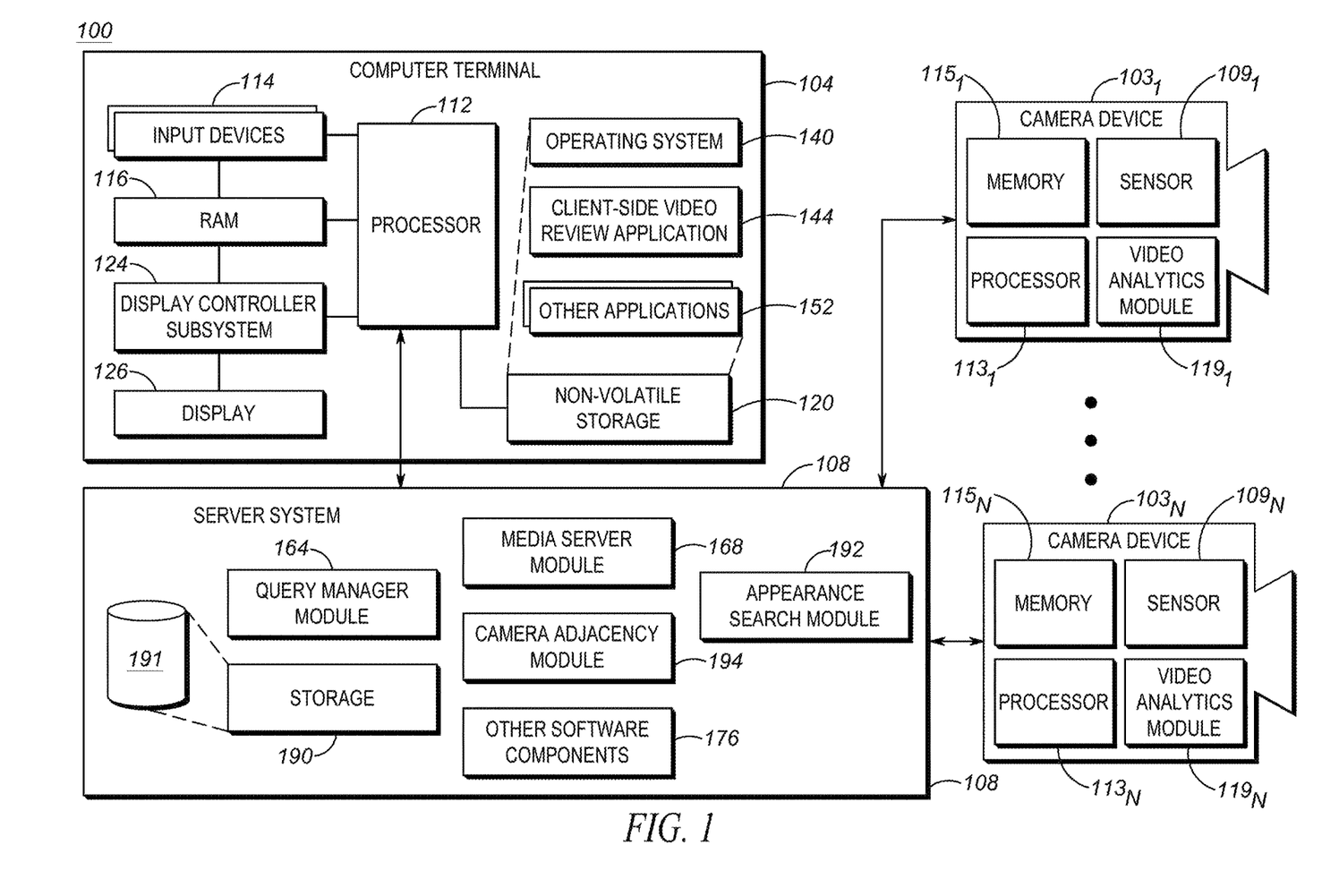
FIG. 1 is a block diagram of a security system in accordance with example embodiments.

Referring now to the drawings, and in particular FIG. 1 which is a block diagram of an example security system 100 within which methods in accordance with example embodiments can be carried out. Included within the illustrated security system 100 are one or more computer terminals 104 and a server system 108. In some example embodiments, the computer terminal 104 is a personal computer system; however in other example embodiments the computer terminal 104 is a selected one or more of the following: a handheld device such as, for example, a tablet, a phablet, a smart phone or a personal digital assistant (PDA); a laptop computer; a smart television; and other suitable devices. With respect to the server system 108, this could comprise a single physical machine or multiple physical machines. It will be understood that the server system 108 need not be contained within a single chassis, nor necessarily will there be a single location for the server system 108. As will be appreciated by those skilled in the art, at least some of the functionality of the server system 108 can be implemented within the computer terminal 104 rather than within the server system 108.

The computer terminal 104 communicates with the server system 108 through one or more networks. These networks can include the Internet, or one or more other public/private networks coupled together by network switches or other communication elements. The network(s) could be of the form of, for example, client-server networks, peer-to-peer networks, etc. Data connections between the computer terminal 104 and the server system 108 can be any number of known arrangements for accessing a data communications network, such as, for example, dial-up Serial Line Interface Protocol/Point-to-Point Protocol (SLIP/PPP), Integrated Services Digital Network (ISDN), dedicated lease line service, broadband (e.g. cable) access, Digital Subscriber Line (DSL), Asynchronous Transfer Mode (ATM), Frame Relay, or other known access techniques (for example, radio frequency (RF) links). In at least one example embodiment, the computer terminal 104 and the server system 108 are within the same Local Area Network (LAN).

The computer terminal 104 includes at least one processor 112 that controls the overall operation of the computer terminal. The processor 112 interacts with various subsystems such as, for example, input devices 114 (such as a selected one or more of a keyboard, mouse, touch pad, roller ball and voice control means, for example), random access memory (RAM) 116, non-volatile storage 120, display controller subsystem 124 and other subsystems. The display controller subsystem 124 interacts with display 126 and it renders graphics and/or text upon the display 126.

Still with reference to the computer terminal 104 of the security system 100, operating system 140 and various software applications used by the processor 112 are stored in the non-volatile storage 120. The non-volatile storage 120 is, for example, one or more hard disks, solid state drives, or some other suitable form of computer readable medium that retains recorded information after the computer terminal 104 is turned off. Regarding the operating system 140, this includes software that manages computer hardware and software resources of the computer terminal 104 and provides common services for computer programs. Also, those skilled in the art will appreciate that the operating system 140, client-side video review application 144, and other applications 152, or parts thereof, may be temporarily loaded into a volatile store such as the RAM 116. The processor 112, in addition to its operating system functions, can enable execution of the various software applications on the computer terminal 104.

Regarding the video review application 144, this can be run on the computer terminal 104 and may include a search User Interface (UI) module for cooperation with a search session manager module in order to enable a computer terminal user to carry out actions related to providing input in relation images, live video and video recordings (such as, for example, input to facilitate carrying out one or more appearance searches). Also, regarding the aforementioned search session manager module, this provides a communications interface between the search UI module and a query manager module 164 of the server system 108. In at least some examples, the search session manager module communicates with the query manager module 164 through the use of Remote Procedure Calls (RPCs). The query manager module 164 receives and processes queries originating from the computer terminal 104, which may facilitate retrieval and delivery of specifically defined video and radar data (and respective metadata) in support of, for example, client-side video review, video export, managing event detection, etc. In this regard, the query manager module is communicatively coupled to the storage 190 (described later herein in more detail) and an appearance search module 192 that supports appearance searches.

Referring once again to FIG. 1, the server system 108 includes several software components (besides the query manager module 164 already described) for carrying out other functions of the server system 108. For example, the server system 108 includes a media server module 168. The media server module 168 handles client requests related to storage and retrieval of security video taken by camera devices $103_1$-$103_n$ in the security system 100. The server system 108 also includes a camera adjacency module 194 the details of which will be later herein described in more detail.

The server system 108 also includes a number of other software components 176. These other software components will vary depending on the requirements of the server system 108 within the overall system. As just one example, the other software components 176 might include special test and debugging software, or software to facilitate version updating of modules within the server system 108. As another example of the other software components 176 may include an analytics engine component. The analytics engine component can, in some examples, be any suitable one of known commercially available software that carry out computer vision related functions (complementary to any video analytics performed in the cameras) as understood by a person of skill in the art.

Regarding the storage 190, this comprises, for example, one or more databases 191 which may facilitate the organized storing of recorded security video, non-video sensor data, etc. in accordance with example embodiments. The one or more databases 191 may also contain metadata related to, for example, the recorded security video that is storable within one or more storages. Examples of metadata that may be expected to be derived directly or indirectly from video data include location in field of view, object ID, bounding box-related data, tracking position relative to field of view, etc. It is also contemplated that the one or more databases 191 may also contain tracks. As will be appreciated by those skilled in the art, "tracks" are created in tracking, where each track encompasses one grouping of all detections pertaining to a same tracked object and each track is uniquely identifiable. Tracks may be formed of a plurality of "tracklets" which are subsequently herein explained in more detail.

The illustrated security system 100 includes a plurality of camera devices $103_1$-$103_n$ (hereinafter interchangeably referred to as "cameras $103_1$-$103_n$" when referring to all of the illustrated cameras, or "camera 103" when referring to any individual one of the plurality) being operable to capture a plurality of images and produce image data representing the plurality of captured images. The camera 103 is an image capturing device and includes security video cameras. Furthermore, it will be understood that the security system 100 includes any suitable number of cameras (i.e. n is any suitable integer greater than one).

The camera 103 includes an image sensor 109 for capturing a plurality of images. The camera 103 may be a digital video camera and the image sensor 109 may output captured light as a digital data. For example, the image sensor 109 may be a CMOS, NMOS, or Charge-Couple Device (CCD). In some embodiments, the camera 103 may be an analog camera connected to an encoder. The illustrated camera 103 may be a 2D camera; however use of a structured light 3D camera, a time-of-flight 3D camera, a 3D Light Detection and Ranging (LiDAR) device, a stereo camera, or any other suitable type of camera within the security system 100 is contemplated.

The image sensor 109 may be operable to capture light in one or more frequency ranges. For example, the image sensor 109 may be operable to capture light in a range that substantially corresponds to the visible light frequency range. In other examples, the image sensor 109 may be operable to capture light outside the visible light range, such as in the infrared and/or ultraviolet range. In other examples, the camera 103 may have similarities to a "multi-sensor" type of camera, such that the camera 103 includes pairs of two or more sensors that are operable to capture light in different and/or same frequency ranges.

The camera 103 may be a dedicated camera. It will be understood that a dedicated camera herein refers to a camera whose principal features is to capture images or video. In some example embodiments, the dedicated camera may perform functions associated with the captured images or video, such as but not limited to processing the image data produced by it or by another camera. For example, the dedicated camera may be a security camera, such as any one of a pan-tilt-zoom camera, dome camera, in-ceiling camera, box camera, and bullet camera.

Additionally, or alternatively, the camera 103 may include an embedded camera. It will be understood that an embedded camera herein refers to a camera that is embedded within a device that is operational to perform functions that are unrelated to the captured image or video. For example, the embedded camera may be a camera found on any one of a laptop, tablet, drone device, smartphone, video game console or controller.

The camera 103 includes one or more processors 113, one or more video analytics modules 119, and one or more memory devices 115 coupled to the processors and one or more network interfaces. Regarding the video analytics module 119, this generates metadata outputted to the server system 108. The metadata can include, for example, records (including tracklet data later herein discussed in more detail) which describe various detections of objects such as, for instance, pixel locations for the detected object in respect of a first record and a last record for the camera within which the respective metadata is being generated.

Regarding the memory device 115, this can include a local memory (such as, for example, a random access memory and a cache memory) employed during execution of program instructions. Regarding the processor 113, this executes computer program instructions (such as, for example, an operating system and/or software programs), which can be stored in the memory device 115.

In various embodiments the processor 113 may be implemented by any suitable processing circuit having one or more circuit units, including a digital signal processor (DSP), graphics processing unit (GPU) embedded processor, a visual processing unit or a vison processing unit (both referred to herein as "VPU"), etc., and any suitable combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any suitable combination thereof. Additionally or alternatively, such processing circuit may be implemented as a programmable logic controller (PLC), for example. The processor may include circuitry for storing memory, such as digital data, and may comprise the memory circuit or be in wired communication with the memory circuit, for example. A system on a chip (SOC) implementation is also common, where a plurality of the components of the camera 103, including the processor 113, may be combined together on one semiconductor chip. For example, the processor 113, the memory device 115 and the network interface of the camera 103 may be implemented within a SOC. Furthermore, when implemented in this way, a general purpose processor and one or more of a GPU or VPU, and a DSP may be implemented together within the SOC.

In various example embodiments, the memory device 115 coupled to the processor 113 is operable to store data and computer program instructions. The memory device 115 may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device 115 may be operable to store memory as volatile memory, non-volatile memory, dynamic memory, etc. or any combination thereof.

Continuing with FIG. 1, the camera 103 is coupled to the server system 108. In some examples, the camera 103 is coupled to the server system 108 via one or more suitable networks. These networks can include the Internet, or one or more other public/private networks coupled together by network switches or other communication elements. The network(s) could be of the form of, for example, client-server networks, peer-to-peer networks, etc. Data connections between the camera 103 and the server system 108 can be any number of known arrangements, examples of which were previously herein detailed. In at least one example embodiment, the camera 103 and the server system 108 are within the same Local Area Network (LAN). In some examples, the camera 103 may be coupled to the server system 108 in a more direct manner than as described above. The camera 103 by itself or in combination with the server system 108 is configured to carry out classification of a type that, by virtue of the image data being generated, may be of a finer granularity as compared to classification from radar devices herein described.

Figure 2:
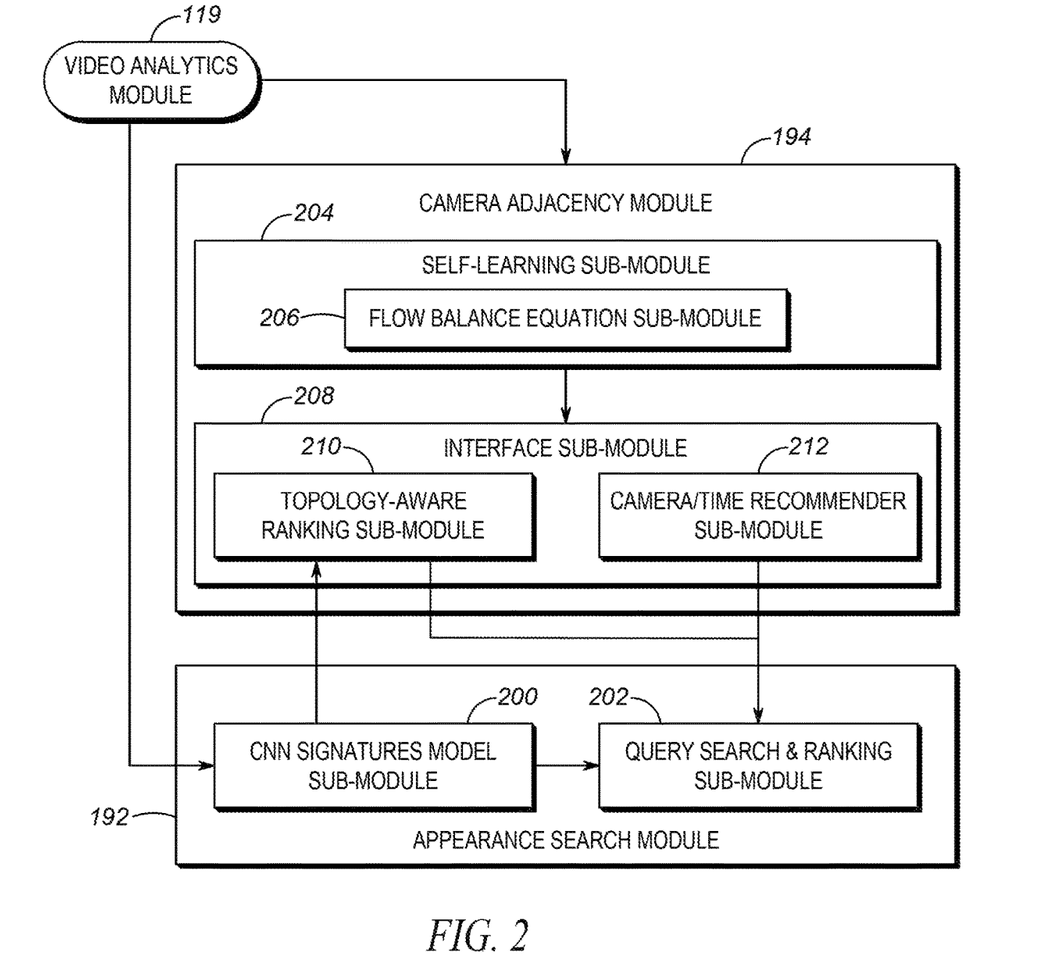
FIG. 2 is a block diagram showing more details of certain modules within the server system and camera devices forming part of the security system shown in FIG. 1.

Reference is now made to the block diagram of FIG. 2. This block diagram shows more details of the server system 108 and the camera devices $103_1$-$103_n$. In particular, more details of the video analytics module 119, the appearance search module 192 and the camera adjacency module 194 are illustrated. As shown, the appearance search module 192 includes a Convolutional Neural Network (CNN) signatures model sub-module 200 that receives metadata from the video analytics module 119 as input and outputs chip signatures that the CNN signatures model sub-module 200 determines to be optimum. The appearance search module 192 also includes a query search and ranking sub-module 202 that receives input from the CNN signatures model sub-module 200 and other sub-modules to build a probabilistic model for scoring a candidate detection against a query. In accordance with example embodiments, rather than carrying out exhaustive searching of videos recorded by the camera devices $103_1$-$103_n$, the appearance search module 192 in cooperative operation with the camera adjacency module 194 enables selective searching (thereby avoiding exhaustive searching).

The camera adjacency module 194, which receives metadata from the video analytics module 119 as input, is also shown in FIG. 2. The camera adjacency module 194 includes a self-learning sub-module 204, which in turn includes a flow balance equation sub-module 206. The camera adjacency module 194 also includes an inference sub-module 208, which in turn includes a topology-aware ranking sub-module 210 and a camera/time recommender sub-module 212. The operations and functions provided the above-mentioned sub-modules of camera adjacency module 194 will be discussed in more detail below, starting with the self-learning sub-module 204.

Data processed by the self-learning sub-module 204 can include tracklet data. Tracklets can exist for every person in every camera. In at least one example embodiment, each tracklet is presented in the following standardized data format which is detailed further in Table 1 below: (CameraID, t_start, t_end, bbox_start, bbox_end).

TABLE 1

Tracklet Data

| Name | Description |
|---|---|
| CameraID | This is a unique name for the camera which distinguishes this camera from the rest within the security system 100. |
| t_start | This represents the "time stamp" when this object was first captured by the camera of "CameraID". This "time stamp" only needs to be a reference in the temporal dimension, which is consistent across cameras within the security system 100. |
| t_end | This represents the "time stamp" when this object was last captured by the camera of "CameraID". |
| bbox_start | This represents the bounding box location of the object in the video frame as t start. An example of how the bounding box location can be represented is as follows: [x_topLeft, y_topLeft, x_bottomRight, y_bottomRight]; however those skilled in the art will appreciate that other forms of representing it can also be used as long as the form describes the location information in a clear manner. |
| bbox_end | This represents the bounding box location of the object in the video frame at t end. |

The above data can be included in, for example, metadata transmitted from the video analytics module 119. Exterior entry/exit zones may also impact tracklet labelling. For example, if a bbox_start is in an exterior entry zone, the tracklet may be labeled as arriving from outside the security system 100 (otherwise, the tracklet is arriving from another camera). As a second example, if a bbox_end is in an exterior exit zone, the tracklet may be labeled as leaving to outside the security system 100 (otherwise, the tracklet is leaving to another camera).

For the flow balance equation sub-module 206, certain mathematical calculations are carried out and various flows may be defined as detailed in Table 2 below.

TABLE 2

Types of Flows

| Type of Flow | Description |
|---|---|
| Outflows | $F_i^{out}(t)$ = rate of people leaving camera i at time t |
| Inflows | $F_j^{in}(t)$ = rate of people arriving at camera j at time t |
| Inflows from Outside | $F_{0j}^{in}(t)$ = rate of people arriving at camera j, from outside at time t |

In practice, time can be discretized into $\Delta t$ time steps: $t_0$, $t_0+\Delta t$, $t_0+2\Delta t$, . . . .

By default, $t_0$ can be the smallest t_start in the data.

$F_i^{out}(t_l)$=number of tracklets in camera i whose t_end lies in the interval $[t_0+l\Delta t, t_0+(l+1)\Delta t]$ and whose bbox_end may lie inside or outside an exterior exit zone.

$F_j^{in}(t_l)$=number of tracklets in camera j whose t_start lies in the interval $[t_0+l\Delta t, t_0+(l+1)\Delta t]$ and whose bbox_start may lie inside or outside an exterior exit zone.

$F_{0j}^{in}(t_l)$=number of tracklets in camera j whose t_start lies in the interval $[t_0+l\Delta t, t_0+(l+1)\Delta t]$ and whose bbox_start lies in an exterior entry zone.

In accordance with a number of example embodiments, the flow balance equation sub-module 206 balances the dynamics of inflows and outflows at all cameras in the security system 100. Inflows into a camera are equated with the outflows coming from all other cameras, accounting for the probability that each outflowing person will make the transition as well as the time taken.

Based on the Transition Model, the expected number of people arriving at camera j at time $t_l$, who took $\tau$ amount of time to transition directly from camera i, equals the number of people leaving camera i at time $t_l-\tau$ multiplied by the probability for each such person to take $\tau$ amount of time to arrive at camera j:

$$F_i^{out}(t_l-\tau) \cdot D_{ij} d_{ij}(\tau) \qquad (1)$$

Integrating over all transition times $\tau$, the expected number of people arriving at camera j from camera i at time $t_l$ is:

$$\int F_i^{out}(t_l-\tau) \cdot D_{ij} d_{ij}(\tau) d\tau \equiv (F_i^{out} * D_{ij} d_{ij})(t_l) \qquad (2)$$

Summing over all cameras and the outside of system, the expected number of people arriving at camera j at time $t_l$ is:

$$F_{0j}^{in}(t_l) + \sum_{i=1}^{n_c} (F_i^{out} * D_{ij} d_{ij})(t_l) \qquad (3)$$

The observed number of people arriving at camera j at time $t_l$ is $F_j^{in}(t_l)$.

The Flow Balance Equation is $$F_j^{in}(t_l) \sim \text{Distribution}\left\{ \text{mean} = F_{0j}^{in}(t_l) + \sum_{i=1}^{n_c} (F_i^{out} * D_{ij} d_{ij})(t_l) \right\} \qquad (4)$$

The observed $F_j^{in}(t_l)$ comes from a distribution whose mean is the expected number of people arriving at camera j.

In terms of the Flow Balance Equation for the Transition Model parameters $D_{ij}$, $d_{ij}$, least squares estimation with regularization is as follows:

$$\min \sum_{j,t_l} \left( F_j^{in}(t_l) - F_{0j}^{in}(t_l) - \sum_{i=1}^{n_c} (F_i^{out} * D_{ij} d_{ij})(t_l) \right)^2 \Big/ s_j^2 + \text{Regulaization} \qquad (5)$$

One may use an estimate for the variance for $s_j^2$; or use $s_j^2=1$.

One may use non-parametric form for $d_{ij}$ with substitution $Z_{ij}=D_{ij}d_{ij}$, to make the problem a convex optimization. Furthermore, convex optimization may be used in connection with Maximum Likelihood Estimation as a possible solution method for the Flow Balance Equation.

One may use a Poisson model or other statistical model for $F_{0j}^{in}(t)$ if it is not computable (e.g. if exterior entry zones are not available).

One may allow a burn-in period with $t_l$ starting from $t_0+n\Delta t$; otherwise, the least squares estimation may involve $F_i^{out}(t)$ with $t<t_0$ for which there is no data.

One may use regularization to reduce overfit and improve generalization:
- Grouped $L^p$-$L^1$ lasso: Sparsity of transition distributions
- Total variation of $d_{ij}$: smooths the distribution
- Negative Entropy of $d_{ij}$: increase information of the distribution One may add constraints on the parameters. For example, if $F_{i0}^{out}(t)$ is computable (for example, if exterior exit zones are available), then use the constraint:

$$\sum_{j=1}^{n_c} D_{ij} = 1 - D_{i0} \text{ for } i = 1, \ldots, n_c \quad (6)$$

where:

$$D_{i0} = \frac{\sum_{t_l} F_{i0}^{out}(t_l)}{\sum_{t_l} F_i^{out}(t_l)} \quad (7)$$

is the probability to transition from camera i to outside the security system 100.

If $F_{i0}^{out}(t)$ is not computable, then use the constraint:

$$\sum_{j=1}^{n_c} D_{ij} \leq 1 \text{ for } i = 1, \ldots, n_c \quad (8)$$

There is also the reconstructing of time probabilities for general transitions (transitions that are either direct or indirect).

The probability of a general transition time from camera i to j is:

$$g_{ij}(t) = \sum_{path \in all paths \text{ from camera } i \text{ to } j} Pr(t, path) \quad (9)$$

where $Pr(t, path)$ is the probability a person leaving camera i takes the path in time t.

For a path from camera $i \to k_1 \to \ldots \to k_m \to j$:

$$Pr(t,path)=(D_{ik_1}d_{ik_1})*r_{k_1}*(D_{k_1k_2}d_{k_1k_2})*r_{k_2}* \ldots *r_{k_m}* (D_{k_mj}d_{k_mj})(t) \quad (10)$$

Where $r_{k\_i}$ is the distribution of the time the person stays in the FOV of camera $k_i$.

The time taking to traverse the path is the aggregation of the transition time for each step in the path and the residence time in each camera in the path.

One may additionally smooth the $g_{ij}(t)$'s by applying a Gaussian convolution filter with a given kernel width, to regularize and improve generalization.

Regarding the camera/time recommender sub-module 212, this generates recommendation data. An example "Set up" for the camera/time recommender sub-module 212 is as follows.

Given: i) query in camera q; ii) search time interval $[T_{min}, T_{max}]$; and iii) computational budget $T_{budget}$, the camera/time recommender sub-module 212 propose a camera/time recommendation list of (Camera i, $I_{i1}, \ldots, I_{iL_i}$) tuples, for all or a subset of cameras, where each $I_{il}$ is a subinterval of the search time interval. Camera i will be searched over the union of the recommended time intervals $\cup_{l=1}^{L_i} I_{il}$. The total search time over all cameras should be close to the budget:

$$T_{budget} \approx \sum_{i=1}^{n_c} \sum_{l=1}^{L_i} |I_{il}| \quad (11)$$

Regarding an example method implemented within the camera/time recommender sub-module 212, the intervals $I_{il}$ cover all times where the general transition time probability is above a threshold $\theta$:

$$\bigcup_{l=1}^{L_i} I_{il} = \{\tau: g_{qi}(\tau) \geq \theta\} \quad (12)$$

The threshold is adjusted to achieve the desired computational budget $T_{budget}$. Alternatively, instead of a computational budget, one may instead provide a confidence level $100\alpha$ % for finding a match, $$\frac{\sum_i \int_{\cup_l I_{il}} g_{qi}(t)dt}{\sum_i \int_{T_{min}}^{T_{max}} g_{qi}(t)dt} = \alpha \quad (13)$$

Regarding the topology-aware ranking sub-module 210, this generates data in relation to ranking. An example "Set up" for the topology-aware ranking sub-module 210 is as follows.

Given i) a query $h_q$ in camera q; ii) a candidate $h_c$ from the gallery, in camera c; and iii) a similarity score s between query and candidate, topology-aware ranking sub-module 210 finds the probability of a positive match (candidate and query are the same person).

$$Pr(h_c=h_q|t,s,c) \quad (14)$$

In the above, t is the time between the query leaving camera q and the candidate arriving at camera c, which generates the candidate $h_c$. Also, the probability is computed for all candidates in the gallery and used to rank the candidates from highest to lowest probability.

In terms of derivation, one can apply the Bayes rule:

$$Pr(h|t,s,c) = \frac{Pr(t,s|h,c)Pr(h|c)}{Pr(t,s|h,c)Pr(h|c) + Pr(t,s|!h,c)Pr(!h|c)} \quad (15)$$

Furthermore, assuming conditional independence of $Pr(t,s|h,c)$ and $Pr(t,s|!h,c)$:

$$Pr(h|t,s,c) = \frac{Pr(s|h,c)Pr(t|h,c)Pr(h|c)}{Pr(s|h,c)Pr(t|h,c)Pr(h|c) + Pr(s|!h,c)Pr(t|!h,c)Pr(!h|c)} \quad (16)$$

Further, applying Bayes rule again to the Pr(t|h,c) Pr(h|c) and Pr(t|!h,c) Pr(!h|c) terms:

$$Pr(h|t,s,c) = \frac{Pr(s|h,c)Pr(h|t,c)Pr(t|c)}{Pr(s|h,c)Pr(h|t,c)Pr(t|c) + Pr(s|!h,c)Pr(!h|t,c)Pr(t|c)} \quad (17)$$

Finally, cancelling the Pr(t|c) terms in the numerator and denominator, yields the Topology-aware ranking formula:

$$Pr(h|t,s,c) = \frac{Pr(s|h,c)Pr(h|t,c)}{Pr(s|h,c)Pr(h|t,c) + Pr(s|!h,c)Pr(!h|t,c)} \quad (18)$$

In regards to the above:
Pr(s|h,c) and Pr(s|!h,c) are the within-class and between-class similarity distributions.
Pr(h|t,c) is the probability that the query takes time t to transition to the candidate camera, relative to the number of persons entering the target camera $$Pr(h|t,c) = \frac{g_{qc}(t)}{\langle F_c^{in} \rangle}$$

Pr(!h|t,c)=1−Pr(h|t,c)

Figure 3:
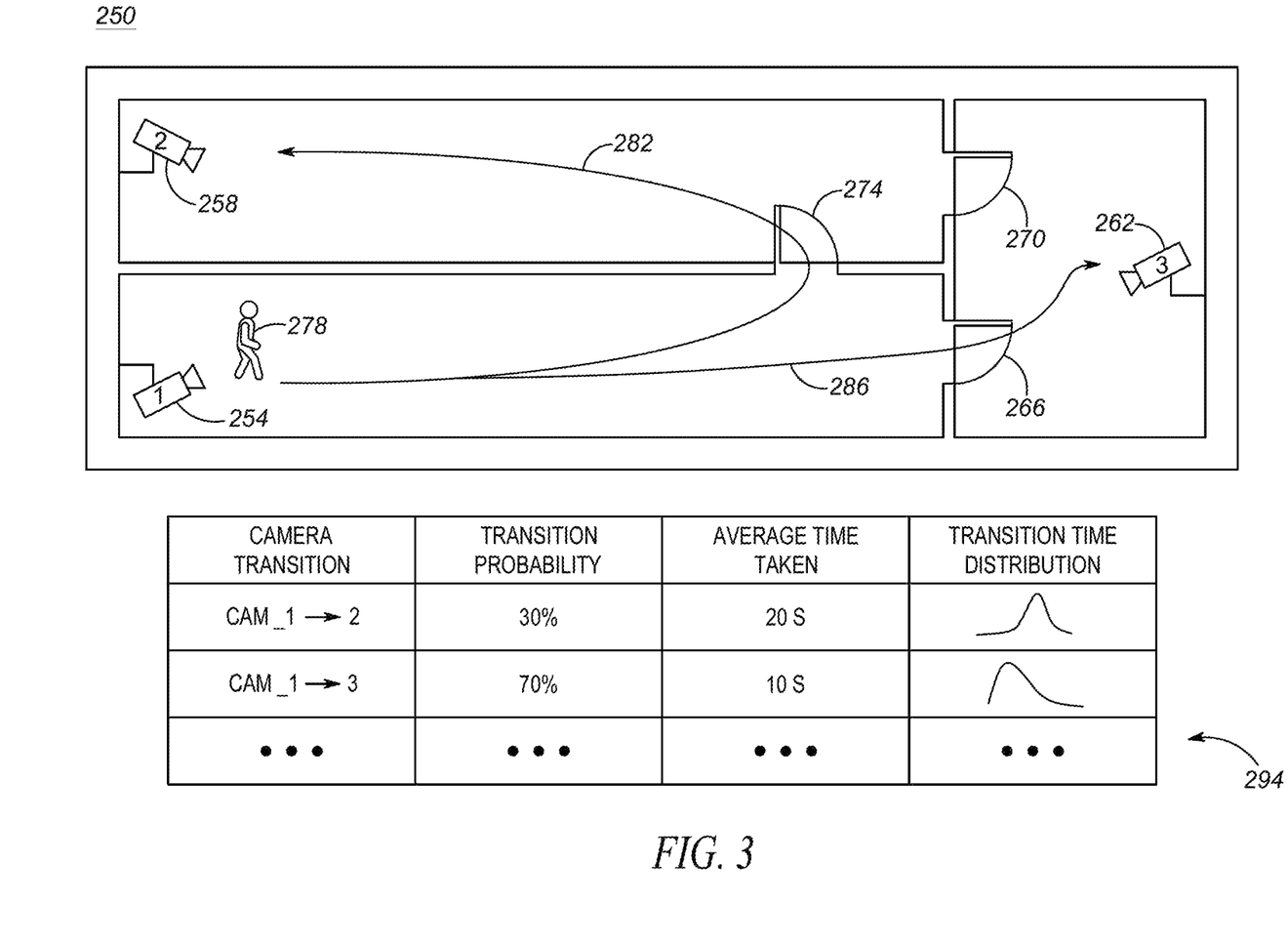
FIG. 3 is a block diagram illustrating transitions between different cameras in accordance with an example embodiment.

Reference is now made to FIG. 3 which is a block diagram illustrating transitions between different cameras in accordance with an example embodiment. In particular, simplified floor plan layout 250 includes illustration of Cam_1 254, Cam_2 258, Cam_3 262 and passageways 266, 270, 274. Also shown within the floor plan layout 250 is a person 278 and available transition paths 282 and 286 for the person 278.

Shown below the floor plan layout 250 is a table 294 which sets out "Transition probability", "Average time taken" and "Transition time distribution" for each of camera transitions Cam_1→Cam_2 and Cam_1→Cam_3. As can be seen from the table 294, a shorter "straight line" separation distance does not necessarily lead to a shorter expected transition time or increased transition probability. Indeed it will be seen that the "straight line" separation distance between the Cam_1 254 and Cam_2 258 is shorter than that as between the Cam_1 254 and the Cam_3 262; however because of the locations of the walls and the passageways 266 and 274 it is actually the case that the transition time between the Cam_1 254 and the Cam_3 262 is less than that as between the Cam_1 254 and the Cam_2 258. Also, the transition probability for a transition between the Cam_1 254 and the Cam_3 262 is 70%, whereas the transition probability for a transition between the Cam_1 254 and the Cam_2 258 is only 30%.

"TRANSITION TIME DISTRIBUTION" is also shown within the table 294. One skilled in the art will appreciate that rather than being a discrete value, transition time is distributed over a range of possible time values because, for example, the movement speed of a person is different from one person to the next.

After initial setup of the security system 100 (including calibrating one or more video cameras to set one or more entry/exit locations of the premises) data to be processed in connection with learning of direct transition probabilities and transition time distributions will initially be limited, but then over a period of time more and more data will be collected and the Transition Model will become more and more accurate.

Figure 4:
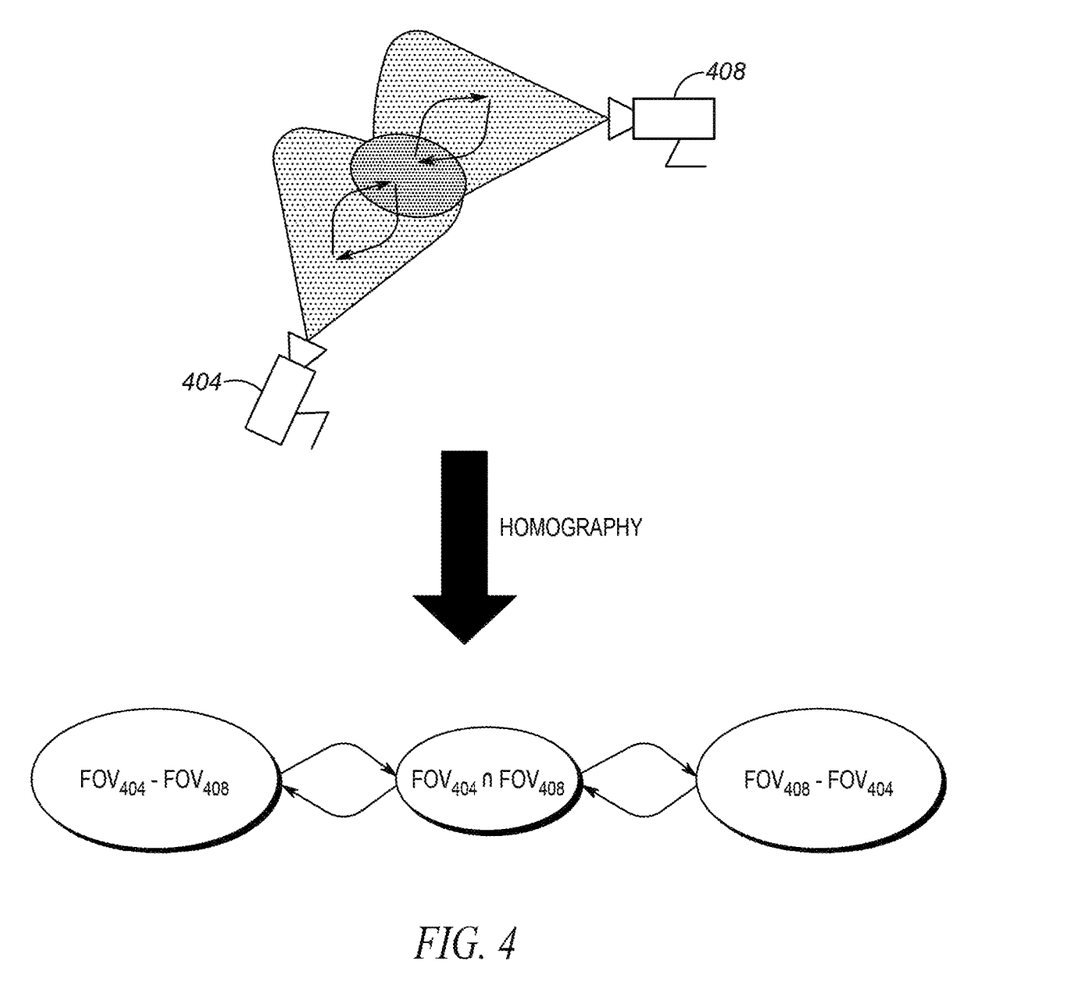
FIG. 4 is a diagram illustrating homography transformation in accordance with an example embodiment.

Reference is now made to FIG. 4. In accordance with at least one example embodiment, homography transformation can be employed in the case of two cameras 404 and 408 with Fields Of Views (FOVs) that overlap. As illustrated in the diagram, a system that includes overlapping FOVs can be re-cast as an augmented system for which a non-overlapping assumption can be applied. In the illustrated example, the two cameras 404 and 408 with partially overlapping FOVs becomes, via transformation, effectively three non-overlapping cameras having the following FOVs: i) $FOV_{404}$-$FOV_{408}$; ii) $FOV_{404} \cap FOV_{408}$; and $FOV_{408}$-$FOV_{404}$.

Figure 5:
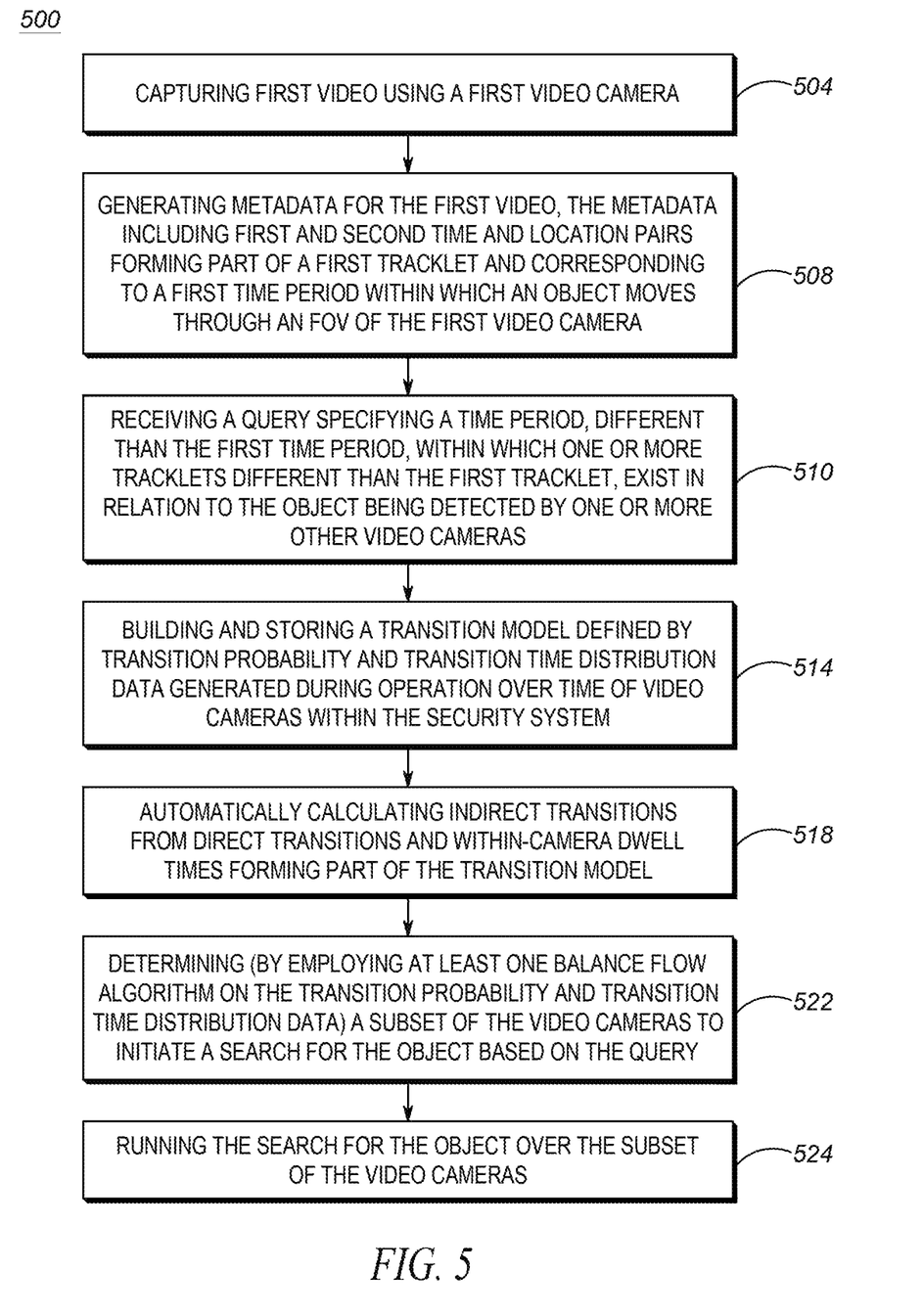
FIG. 5 is a flow chart illustrating a method of predicting inter-camera object movement in accordance with an example embodiment.

Continuing on, FIG. 5 is a flow chart illustrating a method 500 of predicting inter-camera object movement in accordance with an example embodiment. The illustrated method 500 includes capturing (504) first video using a first video camera (the first video camera may be, for example, the Cam_1 254 shown in FIG. 3).

Next the method 500 includes generating (508) metadata for the first video, the metadata including first and second time and location pairs forming part of a first tracklet and corresponding to a first time period within which an object moves through a field of view of the first video camera (for example, t_start, t_end, bbox_start and bbox_end that have been described).

Next the method 500 includes receiving (510) a query specifying a time period, different than the first time period, within which one or more tracklets, different than the first tracklet, exist in relation to the object being detected by one or more video cameras other than the first video camera (such as, for example, Cam_2 258, Cam_3 262, etc.).

Next the method 500 includes building and storing (514) a transition model defined by transition probability and transition time distribution data generated during operation of the first video camera and the one or more video cameras over time.

Next the method 500 includes automatically calculating (518) indirect transitions from direct transitions and within-camera dwell times forming part of the transition model.

Next the method 500 includes determining (522), by employing at least one balance flow algorithm on the transition probability and transition time distribution data, a subset of the video cameras (for example, less than all of the camera devices $103_1$-$103_n$ in the security system 100) to initiate a search for the object based on the query.

Next the method 500 includes running the search (524) for the object over the subset of the video cameras (for example, the appearance search module 192 carrying out an appearance search).

As should be apparent from this detailed description, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot build a spatio-temporal topology for a system of interconnected cameras, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system comprising:
   a plurality of video cameras each having a respective field of view, and the video cameras including a first video camera being configured to capture first video and generate metadata for the first video, the metadata including first and second time and location pairs forming part of a first tracklet and corresponding to a first time period within which an object moves through the field of view of the first video camera; and
   at least one server coupled to the video cameras, the server configured to receive a query specifying a time period, different than the first time period, within which one or more tracklets, different than the first tracklet, exist in relation to the object being detected by one or more of the video cameras other than the first video camera, and
   the server being configured to:
      build and store a transition model defined by transition probability and transition time distribution data generated over time;
      employ at least one balance flow algorithm on the transition probability and transition time distribution data to determine a subset of the video cameras to initiate a search for the object based on the query; and
      run the search for the object over the subset of the video cameras.

2. The system as claimed in claim 1, wherein the server is further configured to automatically calculate indirect camera transitions from direct camera transitions and within-camera dwell times.

3. The system as claimed in claim 1, wherein:
   the object is a person, and
   the video cameras are video security cameras fixedly installed within a premises.

4. The system as claimed in claim 3, wherein the first video camera is calibrated to set an entry/exit location of the premises and when a last object detection associated with the first tracklet is proximate the entry/exit location the first tracklet is labelled as leaving to outside the premises.

5. The system as claimed in claim 3, wherein the first video camera is calibrated to set an entry/exit location of the premises and when a first object detection associated with the first tracklet is proximate the entry/exit location the first tracklet is labelled as coming from outside of the system.

6. The system as claimed in claim 1 wherein each of the plurality of video cameras includes a respective video analytics module configured to generate respective tracklets for detected objects.

7. The system as claimed in claim 1 wherein the server includes a query manager module configured to process the query.

8. The system as claimed in claim 7 wherein the server further includes an appearance search module coupled to the query manager module, the appearance search module including at least one neural network to enable appearance searching within the system.

9. The system as claimed in claim 8 wherein the server includes a camera/time recommender coupled to the appearance search module and configured to provide camera and time period recommendations thereto.

10. The system as claimed in claim 1 wherein the time period specified by the query includes real time or near real time object detection instances.

11. A method comprising:
    capturing first video using a first video camera;
    generating metadata for the first video, the metadata including first and second time and location pairs forming part of a first tracklet and corresponding to a first time period within which an object moves through a field of view of the first video camera;
    receiving a query specifying a time period, different than the first time period, within which one or more tracklets, different than the first tracklet, exist in relation to the object being detected by one or more video cameras other than the first video camera;
    building and storing a transition model defined by transition probability and transition time distribution data generated during operation of the first video camera and the one or more video cameras over time;
    employing at least one balance flow algorithm on the transition probability and transition time distribution data to determine a subset of the video cameras to initiate a search for the object based on the query; and
    running the search for the object over the subset of the video cameras.

12. The method as claimed in claim 11 further comprising automatically calculating indirect camera transitions from direct camera transitions and within-camera dwell times forming part of the transition model.

13. The method as claimed in claim 11, wherein:
    the object is a person, and
    the video cameras are video security cameras fixedly installed within a premises.

14. The method as claimed in claim 11 further comprising calibrating the first video camera to set an entry/exit location of a premises.

15. The method as claimed in claim 14 wherein the first tracklet is labelled as either leaving to outside the premises or coming from outside the premises when a last object detection associated with the first tracklet is proximate the entry/exit location.

16. The method as claimed in claim 11 the time period specified by the query includes real time or near real time object detection instances.

17. A system comprising:
    a plurality of video cameras each having a respective field of view, and the video cameras including a first video camera being configured to capture first video and generate metadata for the first video, the metadata including first and second time and location pairs forming part of a first tracklet and corresponding to a first time period within which an object moves through the field of view of the first video camera; and
    at least one computing machine coupled to the video cameras, the computing machine configured to receive a query specifying a time period, different than the first time period, within which one or more tracklets, different than the first tracklet, exist in relation to the object being detected by one or more of the video cameras other than the first video camera;
    at least one processor; and
    at least one tangible, computer-readable storage medium having instructions encoded therein, wherein the instructions, when executed by the at least one processor, cause a carrying out of a method including:

building and storing a transition model defined by transition probability and transition time distribution data generated over time;

employing at least one balance flow algorithm on the transition probability and transition time distribution data to determine a subset of the video cameras to initiate a search for the object based on the query; and running the search for the object over the subset of the video cameras.

18. The system as claimed in claim 17 wherein the method further includes automatically calculating indirect camera transitions from direct camera transitions and within-camera dwell times.

19. The system as claimed in claim 17 wherein:
the object is a person, and
the video cameras are video security cameras fixedly installed within a premises.

20. The system as claimed in claim 17 wherein each of the plurality of video cameras includes a respective video analytics module configured to generate respective tracklets for detected objects.

* * * * *

UNITED STATES PATENT AND TRADEMARK OFFICE
CERTIFICATE OF CORRECTION

PATENT NO. : 11,031,044 B1  
APPLICATION NO. : 16/819967  
DATED : June 8, 2021  
INVENTOR(S) : Lee et al.

Page 1 of 1

It is certified that error appears in the above-identified patent and that said Letters Patent is hereby corrected as shown below:

On the Title Page

After "(72) Inventors: Chia Ying Lee, Medford, MA (US); Aleksey Lipchin, Newton, MA (US);" delete "Ying" and substitute therefor -- Yin --.

Signed and Sealed this  
Fourth Day of January, 2022

Drew Hirshfeld  
*Performing the Functions and Duties of the*  
*Under Secretary of Commerce for Intellectual Property and*  
*Director of the United States Patent and Trademark Office*